United States Patent
Ekambaram et al.

(10) Patent No.: US 10,248,546 B2
(45) Date of Patent: *Apr. 2, 2019

(54) INTELLIGENT DEVICE SELECTION FOR MOBILE APPLICATION TESTING

(71) Applicant: INTERNATIONAL BUSINESS MACHINES CORPORATION, Armonk, NY (US)

(72) Inventors: Vijay Ekambaram, Tamilnadu (IN); Roger Snook, Charles Town, WV (US); Leigh A. Williamson, Austin, TX (US); Shinoj Zacharias, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,975

(22) Filed: Dec. 15, 2017

(65) Prior Publication Data

US 2018/0203793 A1 Jul. 19, 2018

Related U.S. Application Data

(63) Continuation of application No. 15/407,607, filed on Jan. 17, 2017.

(51) Int. Cl.
*G06F 11/36* (2006.01)

(52) U.S. Cl.
CPC ...... *G06F 11/3672* (2013.01); *G06F 11/3688* (2013.01)

(58) Field of Classification Search
CPC .......................... G96F 11/3672; G06F 11/3688

(Continued)

(56) References Cited

U.S. PATENT DOCUMENTS 7,146,608 B1 * 12/2006 Newman .................. G06F 8/71
717/168
8,601,531 B1 * 12/2013 Zolfonoon ............ G06F 21/604
713/182

(Continued)

FOREIGN PATENT DOCUMENTS

WO WO 2013/119862 A1 8/2013

OTHER PUBLICATIONS

Mel, et al., "The NIST Definition of Cloud Computing," National Institute of Standards and Technology, Information Technology Laboratory, Special Publication 800-145, Sep. 2011 (p. 1-7).

(Continued)

*Primary Examiner* — Anna Deng
(74) *Attorney, Agent, or Firm* — Michael Petrocelli, Esq.; Kevin P. Radigan, Esq.; Heslin Rothenberg Farley & Mesiti P.C.

(57) ABSTRACT

A computer-implemented facility is provided for intelligent mobile device selection for mobile application testing. The computer-implemented facility determines features of a new mobile application to be tested, and compares the features of the new mobile application with features of multiple known mobile applications to identify one or more known mobile applications with similar features. Based at least in part on automated analysis of user reviews of the one or the more known mobile applications operating in one or more types of mobile devices, the facility provides one or more risk scores for operation of the new mobile application in the one or more types of mobile devices. Further, based on the risk scores, a recommended set of mobile devices in which to test the new mobile application may be generated for use in testing the new mobile application.

7 Claims, 7 Drawing Sheets

(58) Field of Classification Search
USPC .......................................................... 717/124
See application file for complete search history.

(56) References Cited

U.S. PATENT DOCUMENTS

| | | | |
|---|---|---|---|
| 9,208,063 B1 | 12/2015 | Sisinni et al. | |
| 9,264,497 B2* | 2/2016 | Jambunathan | H04L 67/141 |
| 9,459,994 B2 | 10/2016 | Koneru et al. | |
| 9,923,931 B1* | 3/2018 | Wagster | H04L 63/30 |
| 2014/0258169 A1* | 9/2014 | Wong | G06Q 30/0282 |
| | | | 705/347 |
| 2014/0357250 A1 | 12/2014 | Nitsan et al. | |
| 2016/0042285 A1* | 2/2016 | Gilenson | G06N 5/046 |
| | | | 706/47 |
| 2016/0092339 A1* | 3/2016 | Straub | G06F 9/44521 |
| | | | 717/124 |

OTHER PUBLICATIONS

IBM, "z/Architecture Principles of Operation," IBM® Publication No. SA22-7832-10, Eleventh Edition, Mar. 2015, pp. 1-1732.
IBM, "Power™ Version 2.07B," International Business Machines Corporation, Apr. 9, 2015, pp. 1-1527.
Ekambaram et al., "Application Rating Prediction for Defect Resolution to Optimize Functionality of a Computing Device," U.S. Appl. No. 14/877,963, filed Oct. 7, 2015 (49 pages).
Ekambaram et al., "Intelligent Device Selection for Mobile Application Testing", U.S. Appl. No. 15/407,607, filed Jan. 17, 2017 (pp. 1-40).
Ekambaram et al., IBM List of Patents and/or Patent Applications Treated as Related, dated Dec. 14, 2017 (pp. 1-2).

\* cited by examiner

INTELLIGENT DEVICE SELECTION FOR MOBILE APPLICATION TESTING

BACKGROUND

Traditionally companies providing a new mobile device application test the mobile device application to ensure that the application functions in a desired manner on various types of mobile devices. For instance, a new mobile application may be tested on various mobile devices operating on different platforms prior to commercialization.

In practice, an organization might obtain a large number of different mobile devices for the purpose of testing a new mobile application. However, as the number of devices continues to increase, it is becoming more and more expensive to obtain a significant percentage of the mobile devices on the market upon which test a mobile application. Further, regular introduction of new device models and maintenance updates to existing mobile devices continues to result in cost escalation for testing new mobile applications on substantially all available devices. With the addition of new mobile device variations, such as wearable devices, the Internet of Things (IoT) smart devices, the range of mobile devices on which a mobile application may need to be tested for operational verification continues to expand.

SUMMARY

The shortcomings of the prior art are overcome and additional advantages are provided through the provision of a computer-implemented method which includes, for instance, determining features of a new mobile application to be tested, and comparing, by a processer, the features of the new mobile application to be tested with features of multiple known applications to identify one or more known mobile applications with similar features. The method also includes, based at least in part on automated analysis of user reviews of the one or more known mobile applications operating in one or more types of mobile devices, providing one or more risk scores for operation of the new mobile application in the one or more types of mobile devices.

Systems and computer program products relating to one or more aspects are also described and claimed herein. Further, services relating to one or more aspects are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The description that follows includes exemplary devices, systems, methods, techniques and instruction sequences that embody techniques of the present invention. However, it should be understood that the described invention may be practiced, in one or more aspects, without the specified details. In other instances, known protocols, structures and techniques have not been shown in detail in order not to obscure the invention. Those of ordinary skill in the art will appreciate that the described techniques and mechanisms may be applied to various systems to facilitate intelligent selection of mobile devices upon which to test a new mobile application as described herein.

In general, a mobile device such as discussed herein, is indicative or inclusive of various types of devices, such as a wireless phone, a cellular phone, a laptop computer, a wireless multimedia device, a tablet, a wireless communication personal computer (PC), a personal digital assistant (PDA), etc. Any mobile device such as reference herein may have memory for storing instructions and data, as well as hardware, software, and firmware combinations thereof. As is well known, mobile devices can receive audio and/or video data packets over wireless networks, and are capable of executing a wide variety of mobile device applications, referred to herein as mobile applications.

As noted, the variations of mobile device offerings in the market today is very large and, with the addition of wearable devices and Internet of Things (IoT) smart devices, the range of devices on which to test or verify a new mobile application is expanding to unsustainable numbers. Thus, it is becoming unfeasible to plan to exhaustively test a new mobile application on every available type of mobile device in the market place on which a user may choose to install the application. Described herein, therefore, is a novel facility for intelligently selecting one or more types of mobile devices upon which to test a new mobile application.

Device specific defects in mobile applications are relatively common for different types of mobile devices. It can be a challenging and expensive process to test a new mobile application on all available device given the different platforms and configurations available. One rule of thumb in the industry to solve the problem is to choose the minimum number of mobile devices having a maximum device characteristic coverage in order to save money. Since new mobile devices are released every day, there is no standard and trivial solution in satisfying the thumb rule. Though existing approaches do help in testing new mobile applications, there are many mobile applications released to customers today where the customer may subsequently complain that the application does not work properly on a particular device.

Advantageously, disclosed herein is an intelligent device selection facility for mobile application testing which, in one or more aspects, may be cloud based. The intelligent device selection facility or process may recommend a set of different types of mobile devices on which a new mobile application may be tested based, at least in part, on automated analysis of user reviews of one or more known mobile applications with similar features. In this manner, a tester may be provided with a recommended set of mobile devices upon which to test the new mobile application before releasing the application and the tester is provided with a higher degree of confidence that the new mobile application will work on most known devices in the marketplace since the new mobile application is to be tested on devices where similar mobile applications with similar features experience problems.

Figure 1:
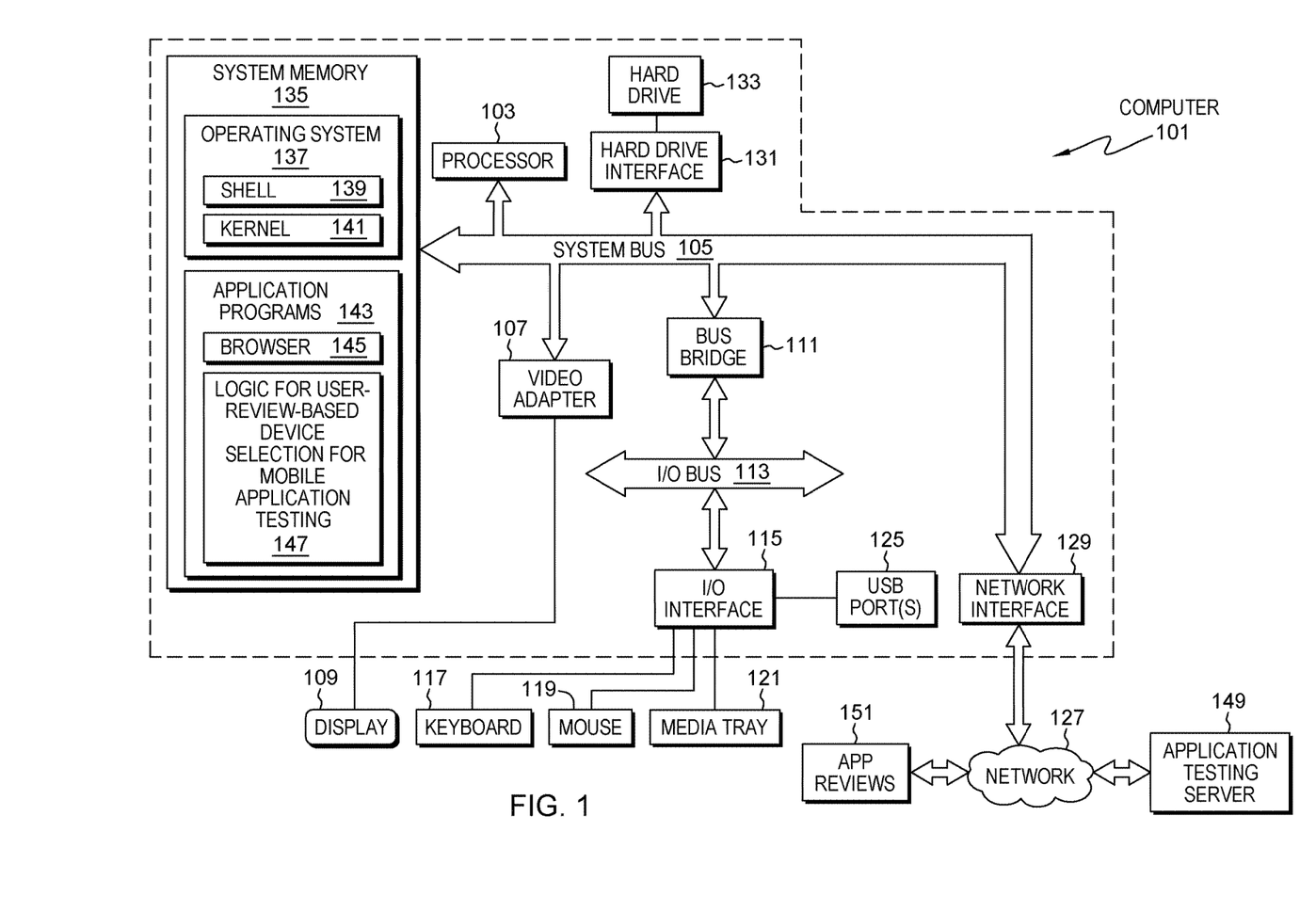
FIG. 1 depicts an exemplary system and network which may implement one or more aspects of the present invention.

With reference now to the figures, and in particular to FIG. 1, a block diagram is depicted of an exemplary system and network that may be utilized by and/or in the implementation of one or more aspects of the present invention. Some or all of the exemplary architecture, including both depicted hardware and software, shown for and within computer 101 may be utilized by application testing server 149 and may access app reviews 151.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with an application testing server 149 and/or other devices/systems (e.g., containing app reviews 151 of known mobile applications operating in particular devices) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 may be a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with application testing server 149 and one or more other systems containing user reviews of known applications (i.e., app reviews 151).

Application programs 143 in computer 101 system memory also includes logic 147 for user-review-based (i.e., intelligent) device selection for mobile application testing, in accordance with one or more aspects of the present invention. This logic may include code for implementing the processes described herein, including (for example) those described below with reference to FIGS. 2-4. In one embodiment, computer 101 may be able to download logic 147 from, for instance, application testing server 149, including in an on-demand basis, wherein the code is not downloaded until needed for execution. In another embodiment of the present invention, application testing server 149 may perform all of the functions associated with the present invention (including execution of logic 147), thus freeing computer 101 from having to use its own internal computing resources to execute logic 147.

In one or more other embodiments, computer 101, with logic 147 for user-review-based device selection for mobile application testing, and application server 149 may be implemented in a common system, which may also include or access a database containing user reviews of known mobile applications (app reviews 151) for use as described herein.

Further, note that the hardware elements depicted in computer 101 are not intended to be exhaustive. For instance, computer 101 may include alternate memory storage devices such as magnetic cassettes, digital versatile disks (DVDs), Bernoulli cartridges, and the like. These and other variations are intended to be within the spirit and scope of the present invention.

As noted, provided herein is an intelligent device selection process for mobile application testing. End users who experience defects in known mobile applications often publicize the defects in one or more app store reviews that they post. Given a statistically significant number of end users, the information contained in these app store reviews can form a corpus of valuable data about which devices are experiencing defects for a given feature of a known mobile application. Disclosed herein is a facility to parse the user review text and capture the information in the reviews that correlates a mobile application feature across multiple different mobile device types in order to narrow down which types of devices are the most important mobile devices on which to test a new mobile application using such features.

In one or more aspects, the facilities described herein leverage a crowd sourced set of data that includes many different applications, users and devices, and pulls from that large data set that mobile devices that appear to be the most problematic for a selected mobile application feature (e.g., selected software component). If the new application to be tested contains a feature (e.g., leverages a capability) that shows as "weak" or often exhibiting defects for one or more mobile devices, then the recommended set of mobile devices upon which to test the new mobile application may include that devices where other users have reported problems with similar features in known mobile applications. Advantageously, where a large number of users of a particular mobile device type across multiple mobile applications report the same (or similar) failure or defect with a certain feature or capability, then any new mobile application using that same feature or capability should at least be tested on those devices where users have reported problems. This concept is elaborated with the addition of risk scores being determined for further refinement of the available information contained, for instance, in the app store review text of the user reviews.

Figure 2:
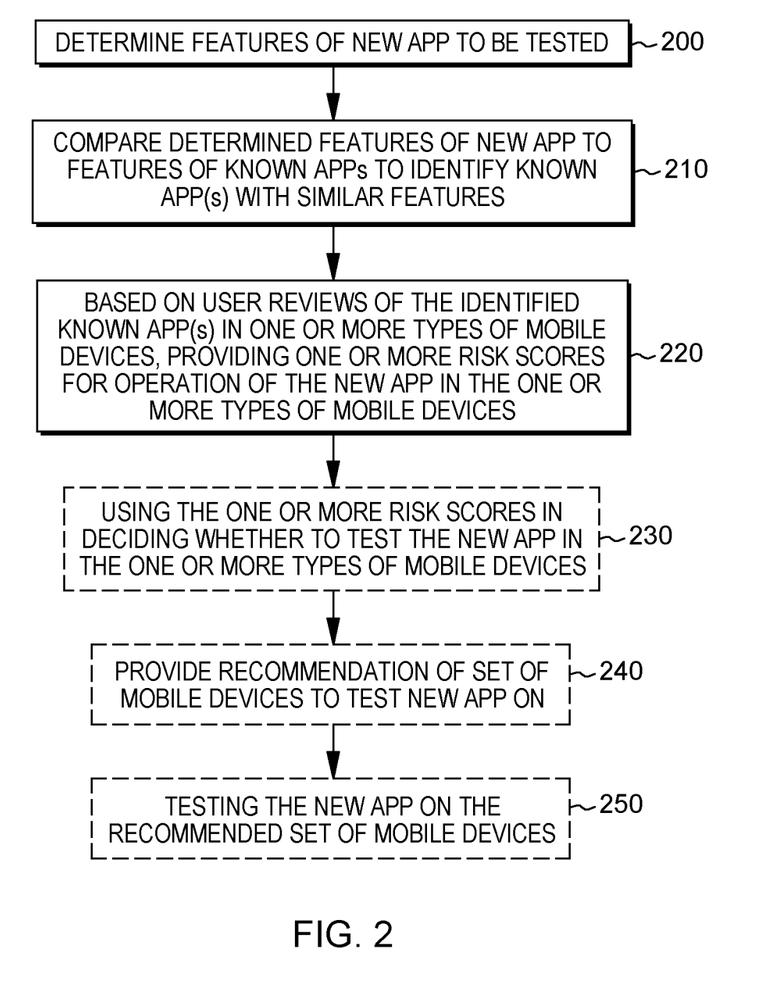
FIG. 2 depicts one embodiment of a process implemented by an intelligent device selection facility, in accordance with one or more aspects of the present invention.

FIG. 2 depicts one embodiment of processing of an intelligent device selection facility for mobile device application testing, in accordance with one or more aspects of the present invention. In one or more embodiments, the processing illustrated is a computer-implemented process, executed, for instance, by one or more processors. As shown, the process may include determining features of a new mobile application to be tested 200, and comparing the features of the new mobile application to be tested with features of multiple known mobile applications to identify one or more known mobile applications with similar features 210. As noted, based at least in part on automated analysis of user reviews of one or more known mobile applications operating in one or more types of mobile devices, the process includes providing one or more risk scores for operation of the new mobile application in the one or more types of mobile devices 220. Further, the process may include using, at least in part, the one or more risk scores in deciding which types of mobile devices to test operation of the new mobile application in 230. For instance, a recommended set of mobile devices to test the new application on may be provided 240, and the new mobile application may be tested at least on the recommended set of mobile device types 250.

In one or more aspects, the intelligent device selection process may utilize a capability to learn about user reviews from one or more generic app stores (such as, online stores that provide mobile applications to consumers and publish reviews about the applications from the consumers). For instance, a representation learner (that is, heuristic logic that is able to evaluate user reviews), may receive generic app store reviews. The representation learner may output a representation for words found in the app store reviews, such that similar words are grouped closer and dissimilar words are further apart. In one or more embodiments, the representation learner may be based on a neural probabilistic language model (NPLM), which understands the context of words in an app review. Since the input to the representation learner is (for instance) the app store reviews, words used in the reviews may be captured, and a correlation between the words may be found. This modeling approach may become more accurate as more reviews are input to the representation learner, since more data points mean better correlations and information. This process may include categorizing reviews as either positive reviews containing praise for a mobile application, or negative reviews having complaints about a mobile application. A computer-implemented sentiment classifier may be trained to recognize positive verses negative reviews, such as by recognizing certain key words (e.g., awful, bad, disappointing, etc.) for negative reviews and other key words (e.g., great, useful, valuable, etc.) for positive reviews.

Additionally, reviews may be classified based on an associated rating (e.g., "5" for the best and "1" for the worst), with outputs from the classifier being predictions as to whether the user reviews were positive or negative. Further, negative reviews may be classified in different types of reviews, such as reviews directed to the functionality of the mobile application, the performance of the mobile application, the usability of the mobile application, etc. The classifier may be trained to classify negative reviews into one or more of these review types, and may appropriately tag the reviews which can advantageously be used to associate or identify features of the known mobile applications with the reviews. Thus, a deep learning based approach may be employed to analyze application store reviews related to one or more known mobile applications to semantically identify defects, prioritize defects and classify defects to, for instance, facilitate the capabilities described herein.

One such system is the Watson™ system available from International Business Machine Corporation of Armonk, N.Y. The Watson™ system is an application of advanced natural language processing, information retrieval, knowledge representation and reasoning, and machine-learning technologies in the field of open domain question answering. The Watson™ system is built on International Business Machine Corporation's DeepQA™ technology used for hypothesis generation, massive evidence gathering, analysis, and scoring.

Figure 3:
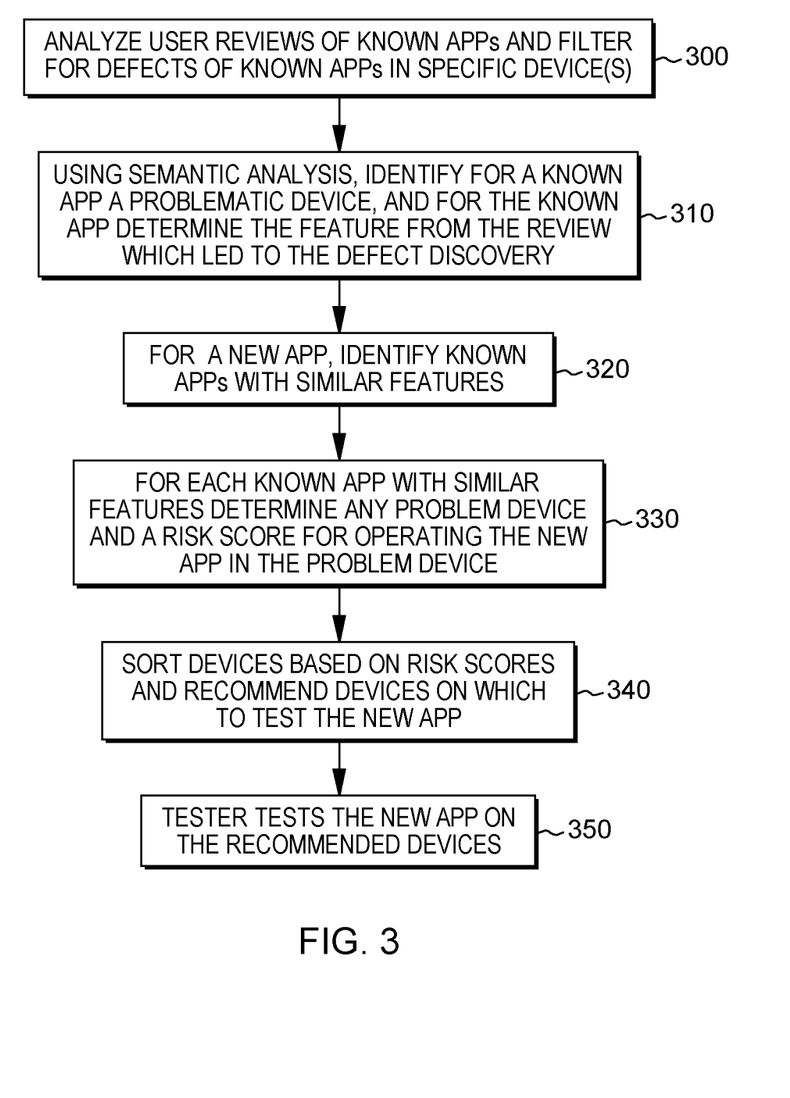
FIG. 3 depicts another embodiment of a process which may be implemented by an intelligent device selection facility, in accordance with one or more aspects of the present invention.

By way of further example, FIG. 3 depicts another embodiment of an intelligent device selection process for mobile application testing, in accordance with one or more aspects of the present invention. The process includes analyzing user reviews of known mobile applications and filtering for defects of known mobile applications in specific types of mobile devices 300. For a known mobile application in the app store, the user reviews of the application may be semantically parsed and filtered to identify reviews which discuss failures or defects of applications in specific types of mobile devices. The user reviews could be collected from an app store, a stack overflow, Twitter™, or any other public data source. By doing semantic analysis on the user reviews, the problematic mobile device types for a particular known mobile application may be identified, and the feature from the reviews which led to the defect discovery may also be determined 310.

For a new mobile application to be tested, the known mobile applications with one or more similar features are identified 320. For instance, an application developer may provide a requirement and feature document for the new mobile application to the intelligent device selection process or facility described herein, which in one or more implementations, may be implemented as a cloud service. The cloud service could determine similar applications in the app store(s) having identical features and requirements.

For each known application with similar features, processing determines or identifies any problem mobile device, and a risk score for operating the new application on that mobile device 330. In one or more embodiments, the risk score may be determined from one or more parameters, such as a degree of feature similarity between the new mobile application and the known mobile application with similar feature(s), a number of defect instances reported for the known mobile application on the particular type of mobile device, a sentiment of user reviews of the known mobile device application on the particular type of mobile device, and a number of like or dislike reviews of the known mobile application on the particular type of mobile device. In one embodiment, the risk score may be based on multiple such parameters, for instance, may be based on a combination of each of the noted parameters. Alternatively, other parameters could be employed to derive the score. The different mobile device types may be sorted based on the ascertained risk scores, and a recommended set of devices may be provided on which to test the new application 340. The recommended set of mobile devices would include those mobile devices where the known mobile application with similar features may have failed or been otherwise problematic. A tester may test the new application on at least the recommended set of mobile device types 350.

Advantageously, the process described results in a higher chance of discovering a problem with a new mobile application by testing that mobile application on the mobile device types with which the known mobile applications with similar features have had problems. For instance, where a known mobile application with the same feature has experienced a problem on a particular mobile device type, then there is a reasonable chance that another, new mobile application implementing the same feature may also experience a problem. Thus, in one or more aspects, disclosed herein is processing for deriving a mapping between application features and problematic devices by mining natural text in user feedback reviews of published applications (e.g., in an app store, or other public place) for suggesting mobile device types to test the new mobile application on based on feature matching and the derived mapping from the user reviews of known mobile applications, for instance, to derive a risk score which may then be used to select the set of mobile device types on which to test the new mobile application.

Figure 4:
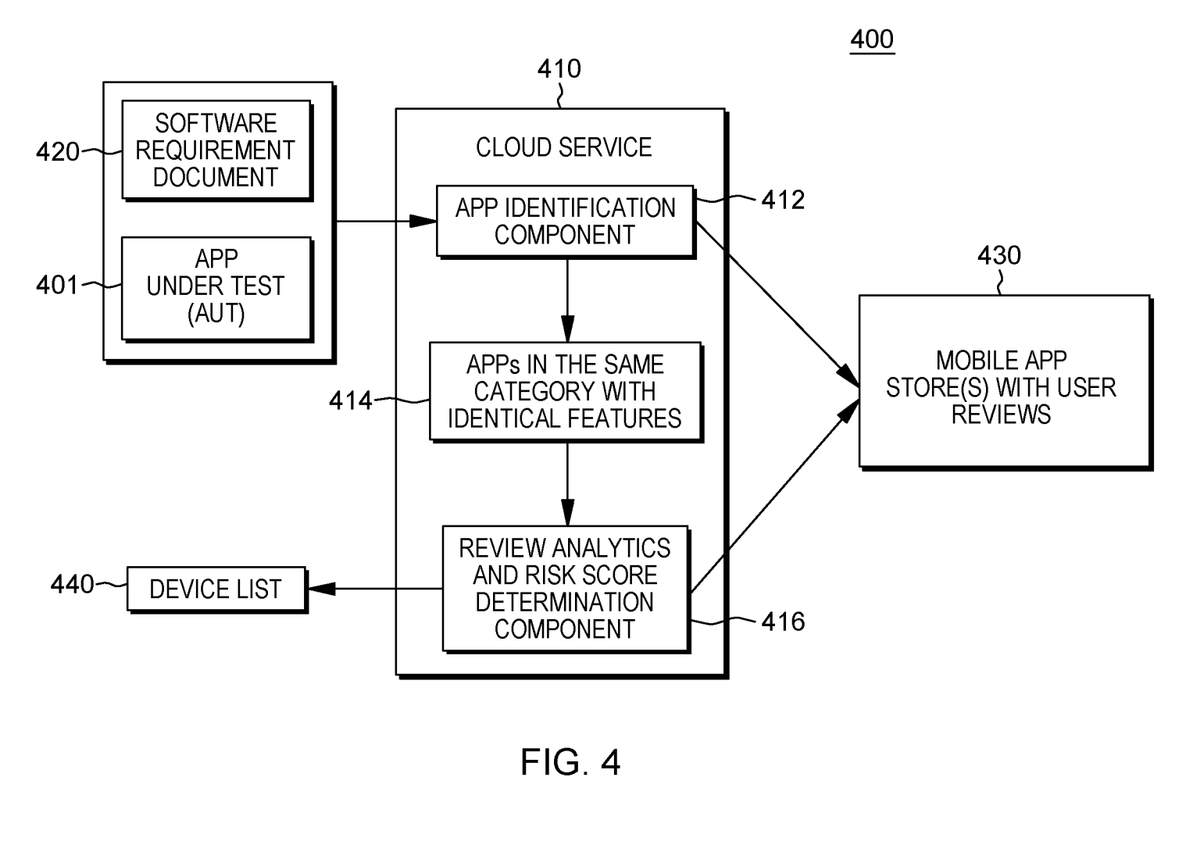
FIG. 4 depicts a further embodiment of an intelligent device selection facility, in accordance with one or more aspects of the present invention.

FIG. 4 depicts a high level system 400 implementing one or more aspects of the present invention. In this embodiment, system 400 is implemented within or includes a cloud based service 410 having an application identification component 412. In one or more implementations, requirement and feature documentation for the new mobile application to be tested 401 may be provided via a software requirement document 420. The application identification component 412 reads the software requirement document to identify the category and features of the mobile application under test 401. Application identification component 412 retrieves the known mobile applications from the mobile app store(s) 430 that are in the same category and also collects the features of the mobile applications from the app store(s). From the list of known mobile applications retrieved from the app store(s) 430, application identification component 412 determines the known mobile applications that have similar features and requirements as the new mobile application (i.e., the application under test 401). The applications in the same category with identical or similar features 414 may be provided to a review analytics and risk score determination component 416 for analytical review and determination of a risk score in order to generate a device list 440 including one or more types of mobile devices upon which the new mobile application is to be tested.

More particularly, for each known mobile application identified with identical or similar features 414, the review analytics and risk score determination component 416 analyzes the reviews of that known mobile application and filters the reviews which identify or discuss failures or defects of the application in specific types of mobile devices. For instance, "My app crashed in mobile device 1 when map is rendered" or "Mobile device 2 got hung when downloading huge data". Semantic analysis of the available user reviews may be performed on the review comments. Defect mining from application store reviews may proceed as described above, in one or more implementations. By performing semantic analysis, the review and risk score component determines the problematic mobile device types for the new mobile application, and determines the features from the reviews which lead to the discovery of the defect respective that mobile device type. A risk score can be calculated for the new mobile application to operate on that particular mobile device type based on a variety of parameters, including, for instance, the degree of requirements/feature similarity, number of instances reported, sentiment of the reviews, and like/dislike of the user review. The discovered known mobile applications are sorted based on their risk score and the problematic mobile device types for those applications are collected in a list to be provided to the tester. In this manner, the tester or new application developer has a higher chance of discovering more defects by testing the new mobile application in the more problematic mobile device types.

Exemplary embodiments of further computing environments to implement one or more aspects of the present invention are described below with reference to FIGS. 5-7.

Figure 5:
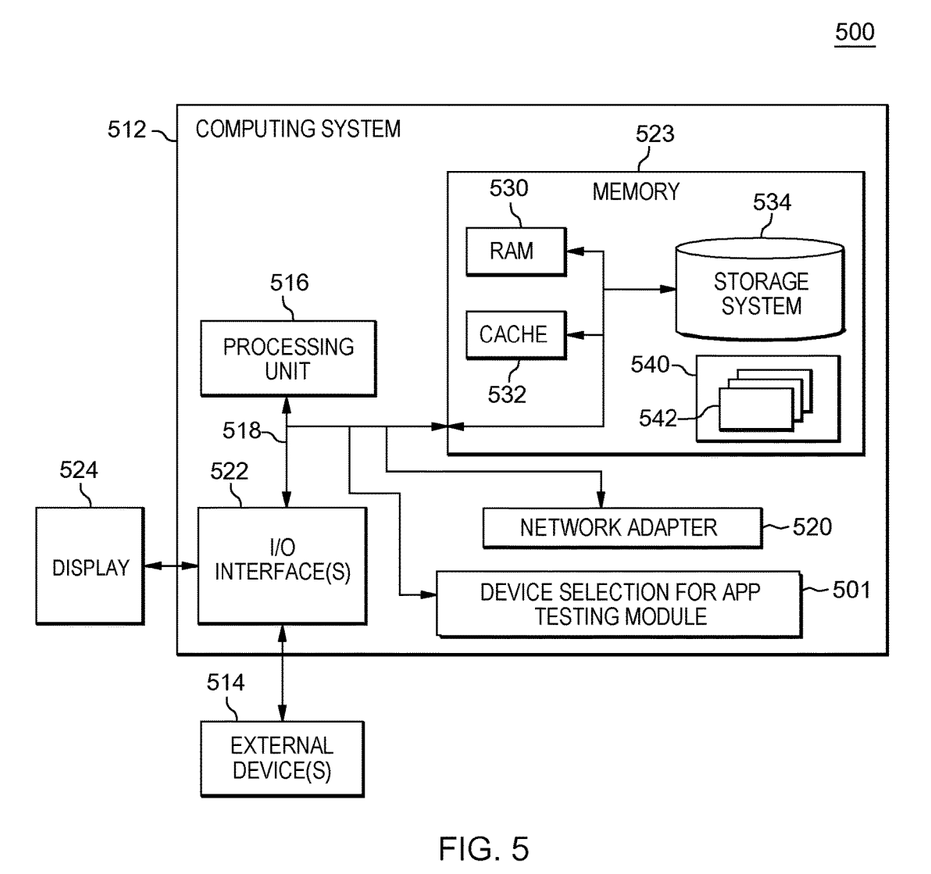
FIG. 5 depicts a further embodiment of a computing system which may incorporate processing, in accordance with one or more aspects of the present invention.

By way of further example, FIG. 5 depicts one embodiment of a computing environment 500, which includes a computing system 512. Examples of well-known computing systems, environments, and/or configurations that may be suitable for use with computer system 512 include, but are not limited to, a desktop computer, a workstation, a handheld or laptop computer or device, a mobile phone, a programmable consumer electronic device, a tablet, a personal digital assistant (PDA), and the like.

Computing system 512 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 5, computing system 512, is shown in the form of a general-purpose computing device. The components of computing system 512 may include, but are not limited to, one or more processors or processing units 516, a system memory 523, and a bus 518 that couples various system components including system memory 523 to processor 516.

In one embodiment, processor 516 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 512 may include a variety of computer system readable media. Such media may be any available media that is accessible by computing system 512, and it includes both volatile and non-volatile media, removable and non-removable media.

System memory 523 can include computer system readable media in the form of volatile memory, such as random access memory (RAM) 530 and/or cache memory 532. Computing system 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 518 by one or more data media interfaces. As described below, memory 523 may include at least one program product having a set (e.g., at least one) of program modules that are configured to carry out the functions of embodiments of the invention.

Program/utility 540, having a set (at least one) of program modules 542, may be stored in memory 532 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Alternatively, a separate, device selection for app testing module, logic, etc., 501 may be provided within computing environment 512.

Computing system 512 may also communicate with one or more external devices 514 such as a keyboard, a pointing device, a display 524, etc.; one or more devices that enable a user to interact with computing system 512; and/or any devices (e.g., network card, modem, etc.) that enable computing system 512 to communicate with one or more other computing devices. Such communication can occur via Input/Output (I/O) interfaces 522. Still yet, computing system 512 can communicate with one or more networks such as a local area network (LAN), a general wide area network (WAN), and/or a public network (e.g., the Internet) via network adapter 520. As depicted, network adapter 520 communicates with the other components of computing system, 512, via bus 518. It should be understood that although not shown, other hardware and/or software components could be used in conjunction with computing system 512. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 5. Computer system/server 512 of FIG. 5 may be practiced in distributed cloud computing environments where tasks are performed by remote processing devices that are linked through a communications network. In a distributed cloud computing environment, program modules may be located in both local and remote computer system storage media including memory storage devices. Computer system/server 512 is capable of being implemented and/or performing any of the functionality set forth hereinabove.

Figure 6:
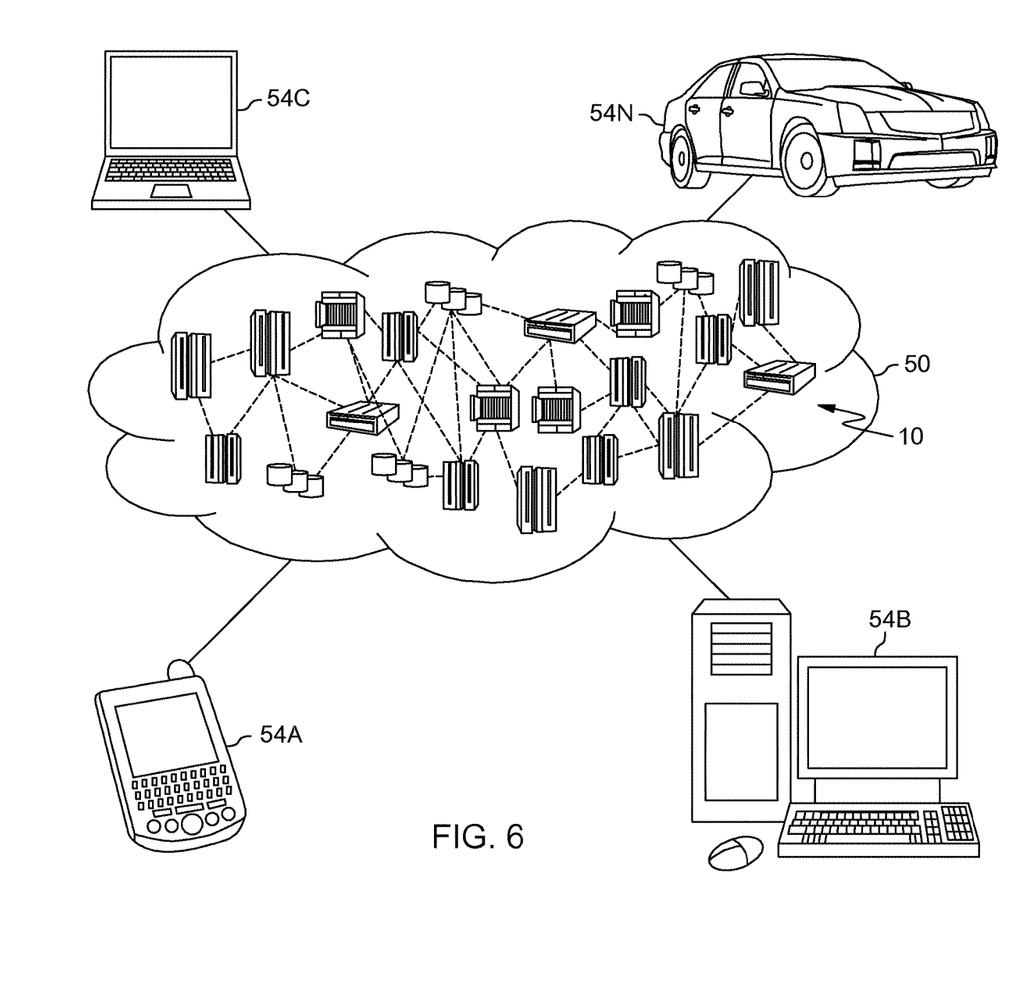
FIG. 6 depicts one embodiment of a cloud computing environment, which may facilitate implementing, or be used in association with, one or more aspects of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
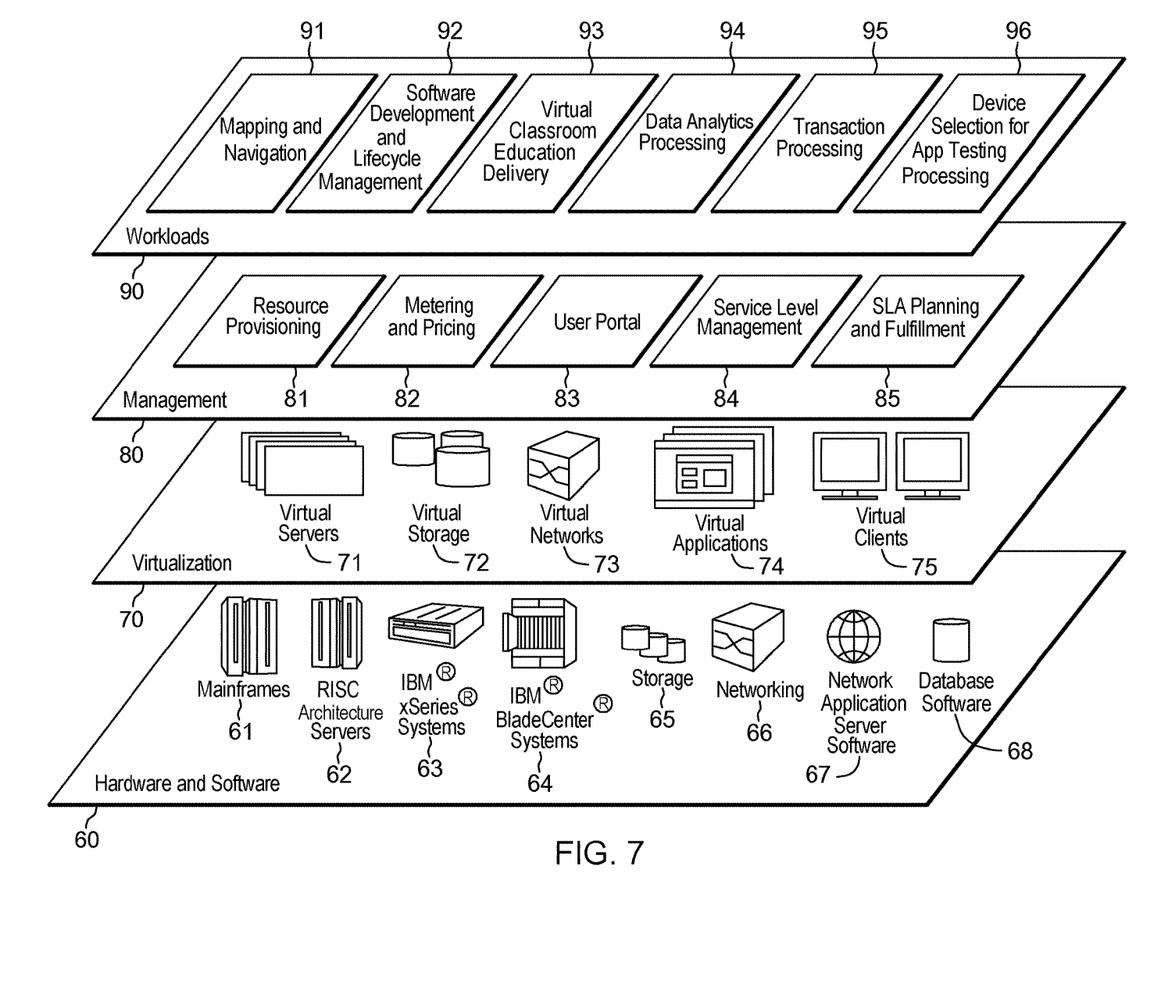
FIG. 7 depicts an example of extraction model layers, which may facilitate implementing processing, in accordance with one or more aspects of the present invention.

Referring to FIG. 7, a set of functional abstraction layers provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and intelligent device selection app testing processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method comprising:
   determining features of a new mobile application to be tested;
   comparing, by a processor, the features of the new mobile application to be tested with features of multiple known mobile applications to identify one or more known mobile applications with similar features; and
   based at least in part on automated analysis of user reviews of the one or more known mobile applications operating in one or more types of mobile devices, providing, by the processor, one or more risk scores for operation of the new mobile application in the one or more types of mobile devices, wherein providing the one or more risk scores comprises generating a respective risk score for operating the new mobile application in each type of mobile device of the one or more types of mobile devices, the respective risk scores being determined based, at least in part, on automated analysis of user reviews of the one or more known mobile applications with similar features operating on that type of mobile device, and wherein the one or more risk scores are each determined based on one or more factors selected from a group consisting of: a degree of feature similarity between the new mobile application and the known mobile application with similar features, a number of defect instances reported for the known mobile application on the type of mobile device, a sentiment of user reviews of the known mobile device application on the type of mobile device, and a number of like or dislike reviews of the known mobile application on the type of mobile device.

2. The computer-implemented method of claim 1, further comprising using, at least in part, the one or more risk scores in deciding which types of mobile devices to test operation of the new mobile application in.

3. The computer-implemented method of claim 1, further comprising automatedly analyzing user reviews of the multiple known mobile device applications operating in the one or more types of mobile devices, and filtering the user reviews to identify any technical issue with a known mobile device application on a particular type of mobile device, the technical issue relating to using of the known mobile device application on that particular type of mobile device.

4. The computer-implemented method of claim 3, wherein the automatedly analyzing is based on semantic analysis of the user reviews of the multiple known mobile applications.

5. The computer-implemented method of claim 1, wherein the features of the new mobile application include features selected from the group consisting of operational requirements for the new mobile application and attributes of the new mobile application for a user.

6. The computer-implemented method of claim 1, further comprising generating a recommended set of mobile devices to test the new mobile application on, the generating being based, at least in part, on the one or more risk scores.

7. The computer-implemented method of claim 6, further comprising testing the new mobile application on the recommended set of mobile devices.

\* \* \* \* \*